US006917793B2

(12) United States Patent
Wang

(10) Patent No.: US 6,917,793 B2
(45) Date of Patent: Jul. 12, 2005

(54) ANTENNA ASSEMBLY WITH A CAPABILITY TO REMEMBER THE FREQUENCY OF REMOTE SIGNALS AND TO SEARCH FOR AND MEMORIZE WIRELESS FREQUENCY BANDS

(75) Inventor: Cheng-Si Wang, Changhua Hsien (TW)

(73) Assignee: Cheng-Fa Wang, Taipei Hsien (TW)

( * ) Notice: Subject to any disclaimer, the term of this patent is extended or adjusted under 35 U.S.C. 154(b) by 481 days.

(21) Appl. No.: 10/243,714

(22) Filed: Sep. 16, 2002

(65) Prior Publication Data

US 2004/0053589 A1 Mar. 18, 2004

(51) Int. Cl.[7] .................................................. H04B 1/18

(52) U.S. Cl. ................................ 455/193.1; 455/161.1; 455/97; 455/269; 343/745

(58) Field of Search ................................ 455/193.1, 97, 455/277.1, 269, 274, 161.1, 161.2; 343/745; 342/377

(56) References Cited

U.S. PATENT DOCUMENTS 3,007,044 A * 10/1961 Cookson ..................... 342/377
5,038,405 A * 8/1991 Karr ........................... 343/745
5,052,049 A * 9/1991 Andros et al. ........... 455/186.1
5,077,834 A * 12/1991 Andros et al. ........... 455/193.1
5,991,637 A * 11/1999 Mack et al. ................ 455/563
6,714,771 B1 * 3/2004 Nagy et al. .............. 451/161.3
6,731,349 B1 * 5/2004 Van Der Wijst ......... 455/161.1
2001/0019948 A1 * 9/2001 Obitsu ..................... 455/193.1

* cited by examiner

*Primary Examiner*—Edward F. Urban
*Assistant Examiner*—Lana Le
(74) *Attorney, Agent, or Firm*—Rosenberg, Klein & Lee

(57) ABSTRACT

An antenna assembly has an antenna set, a rotation assembly and a control circuit for driving the rotation assembly to rotate to adjust receiving angel of the antenna set. The control circuit can learn to adjust remote signals represented different channel number on a remote control to automatically control the receiving angle and direction of an antenna set. Thus, the antenna assembly can be suitable to general remote control to automatically adjust the antenna set to search the wireless bands. Besides, the control circuit further stores data related to the wireless bands with the corresponding channel number to be easy for user turn to specific wireless band without searching step.

9 Claims, 5 Drawing Sheets

ANTENNA ASSEMBLY WITH A CAPABILITY TO REMEMBER THE FREQUENCY OF REMOTE SIGNALS AND TO SEARCH FOR AND MEMORIZE WIRELESS FREQUENCY BANDS

BACKGROUND OF THE INVENTION

1. Field of the Invention

The present invention relates to an antenna assembly with a capability to remember the frequency of remote signals and to search for and memorize wireless frequency bands, and more particularly, to an antenna assembly that can learn to tune to different remote signals represented by channel numbers from a remote control and capable of automatically searching for and adjusting to wireless TV bands.

2. Description of Related Art

Television has become an almost indispensable system for the dissemination of information and entertainment throughout the world. Cable TV or the simultaneous, direct transmission of multiple channels to our homes through land lines rather than wireless broadcast and reception through antennas has become increasingly popular because of the many stations available from cable TV providers. However, cable TV may not be available in sparsely populated or remote areas because of the high cost of providing cable TV to a small number of customers. In those areas, wireless TV is still important.

An antenna for receiving the wireless television signals is absolutely essential with wireless TV. In a conventional wireless TV system configuration, an outdoor antenna has to be set up in an unobscured position so television signals strong enough to display clear images are sent to the TV set. However, erecting and adjusting such an outdoor antenna are difficult. Therefore, compact antennas, such as a modified Adcock antenna or "rabbit ears," have been developed for indoor use. Although the modified Adcock antenna and "rabbit ears" are easy to use, the orientation of the antenna must be manually adjusted when different broadcast sites are selected. If a TV program in a different frequency band is desired, the adjustment of antenna must be repeated. Therefore, the use of modified Adcock antenna or rabbit ears is still not satisfactory.

Accordingly, an improved antenna assembly is desired to mitigate and/or obviate the aforementioned problems.

SUMMARY OF THE INVENTION

The object of the present invention is to provide an antenna assembly with a capability to remember the frequency of remote signals and to search for and memorize wireless frequency bands in response to a remote control. The antenna assembly is also capable of searching for, memorizing and returning to the frequency of wireless TV channels.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
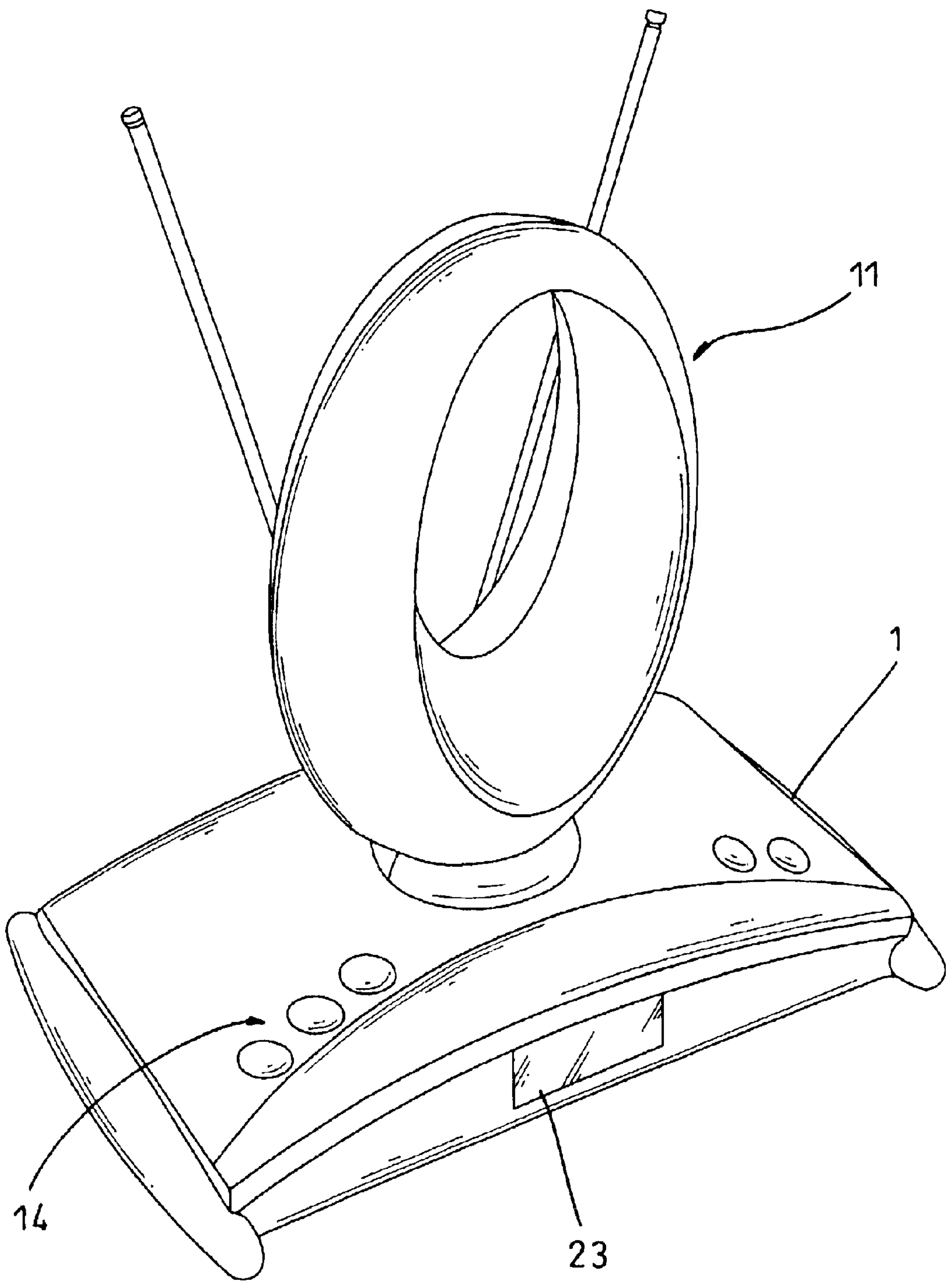
FIG. 1 is a perspective view of an antenna assembly in accordance with the present invention.
Figure 2:
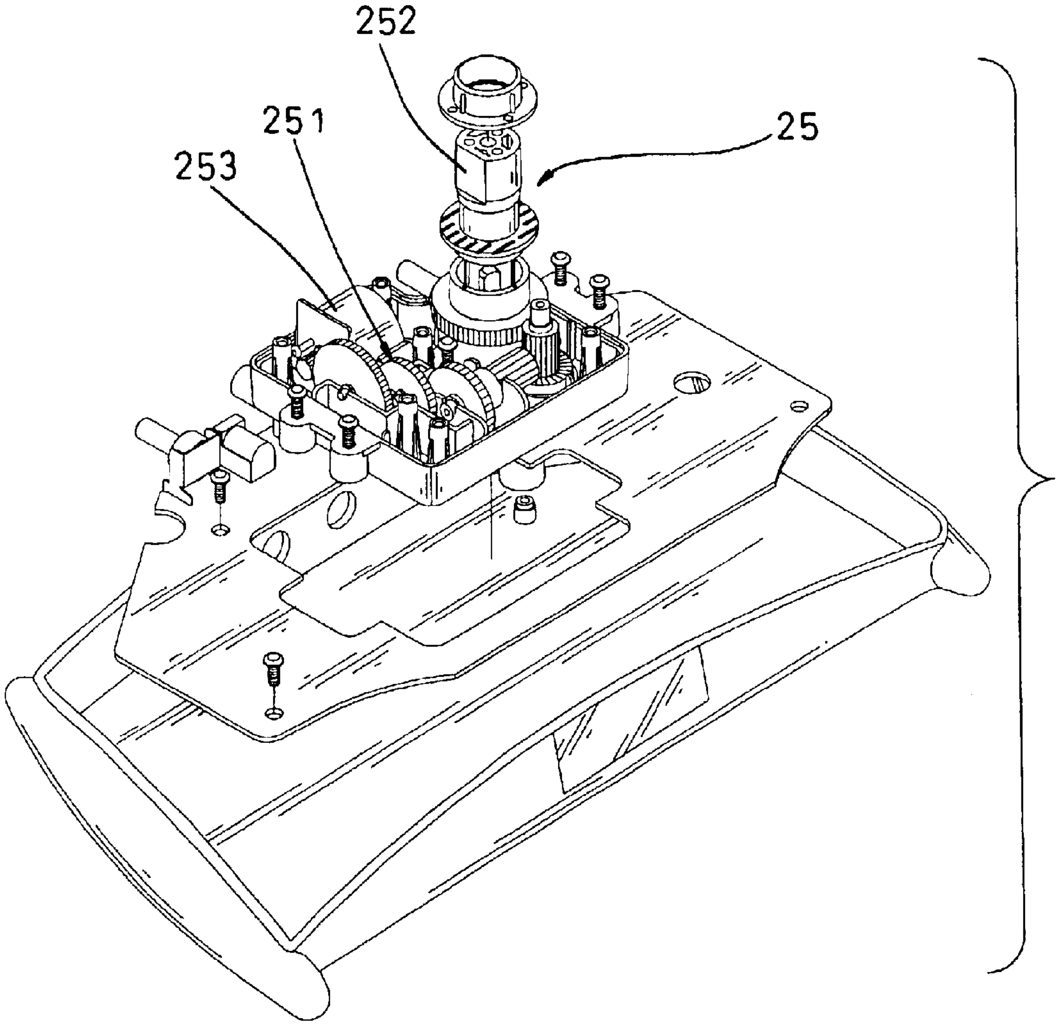
FIG. 2 is a partially exploded perspective view of the interior of the antenna assembly in FIG. 1.

With reference to FIGS. 1 and 2, An antenna assembly with a capability to remember the frequency of remote signals and to search for and memorize wireless frequency bands in accordance with the present invention comprises a casing (1), a rotation assembly (25) having a spindle (252), a gear set (251) and a motor (253), a display (23), a control circuit (not shown) and an antenna set (11).

The control circuit is retained in the casing (1) and is connected to control operation of the motor (253). The motor (253) is engaged with the gear set (251). The antenna set (11) is formed on the top of the casing (1) and is connected to the spindle (252) of the rotation assembly (25) for adjusting its receiving angle and direction by rotating the rotation assembly (25).

Figure 3:
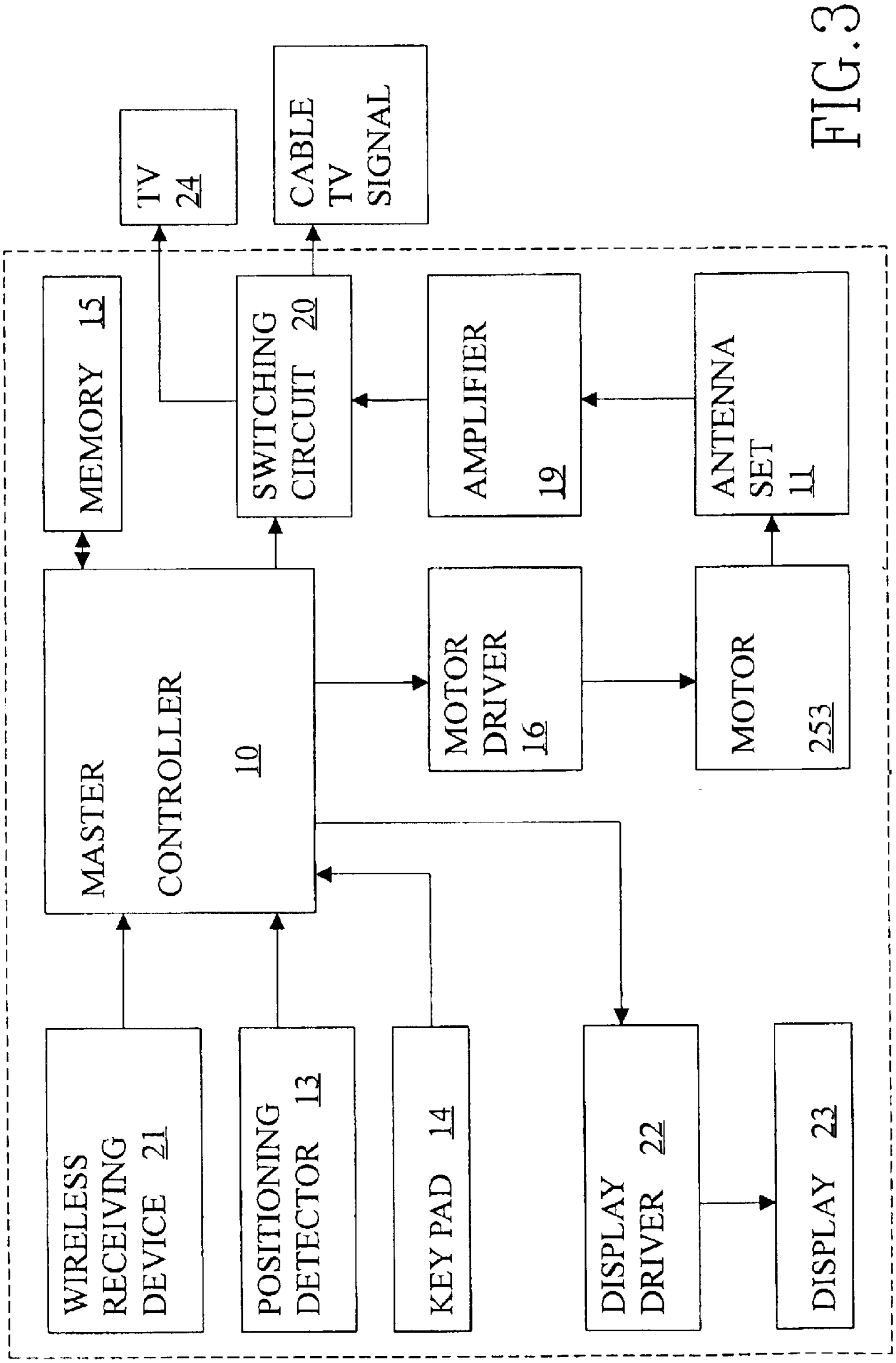
FIG. 3 is a functional block diagram of the antenna assembly in FIG. 1.

With reference to FIG. 3, a block diagram of the control circuit controls the motor to drive and adjust the rotation of the rotation assembly (25), which comprises a master controller (10), a positioning detector (13), a memory (15), a amplifier (19), a switching circuit (20), a display (23), a key pad (14), and a wireless receiving assembly (21).

The master controller (10) has multiple input terminals and output terminals. The motor (351) is connected to the output terminal of the master controller (10) through a motor driver (16), so as to drive the rotation assembly (25) to rotate under the control of the master controller (10).

The positioning detector (13) is connected to the rotation assembly (25), and is connected to the master controller (10) for detecting the angle and position of the antenna set (11). The detected signal from the positioning detector (13) is sent to master controller (10). In this embodiment, the positioning detector (13) is a potentiometer.

The memory (15) is connected to the master controller (10) for recording data of the detected signal inputted from the positioning detector (13). The amplifier (19) is connected to the output terminal of the antenna set (11) for amplifying the output signal from the antenna set (11).

The switching circuit (20) is connected to an output terminal of the master controller (10), and is connected between the amplifier (19) and the cable TV signal terminal (not numbered) for switching either the wireless TV signal from the antenna (11) or the cable TV signal to a TV (24).

The display assembly (23) is connected to the master controller (10) through a display driver (22) for being driven by the master controller (10) to display. The control key pad (14) is connected to the input terminal of the master controller (10).

Figure 5:
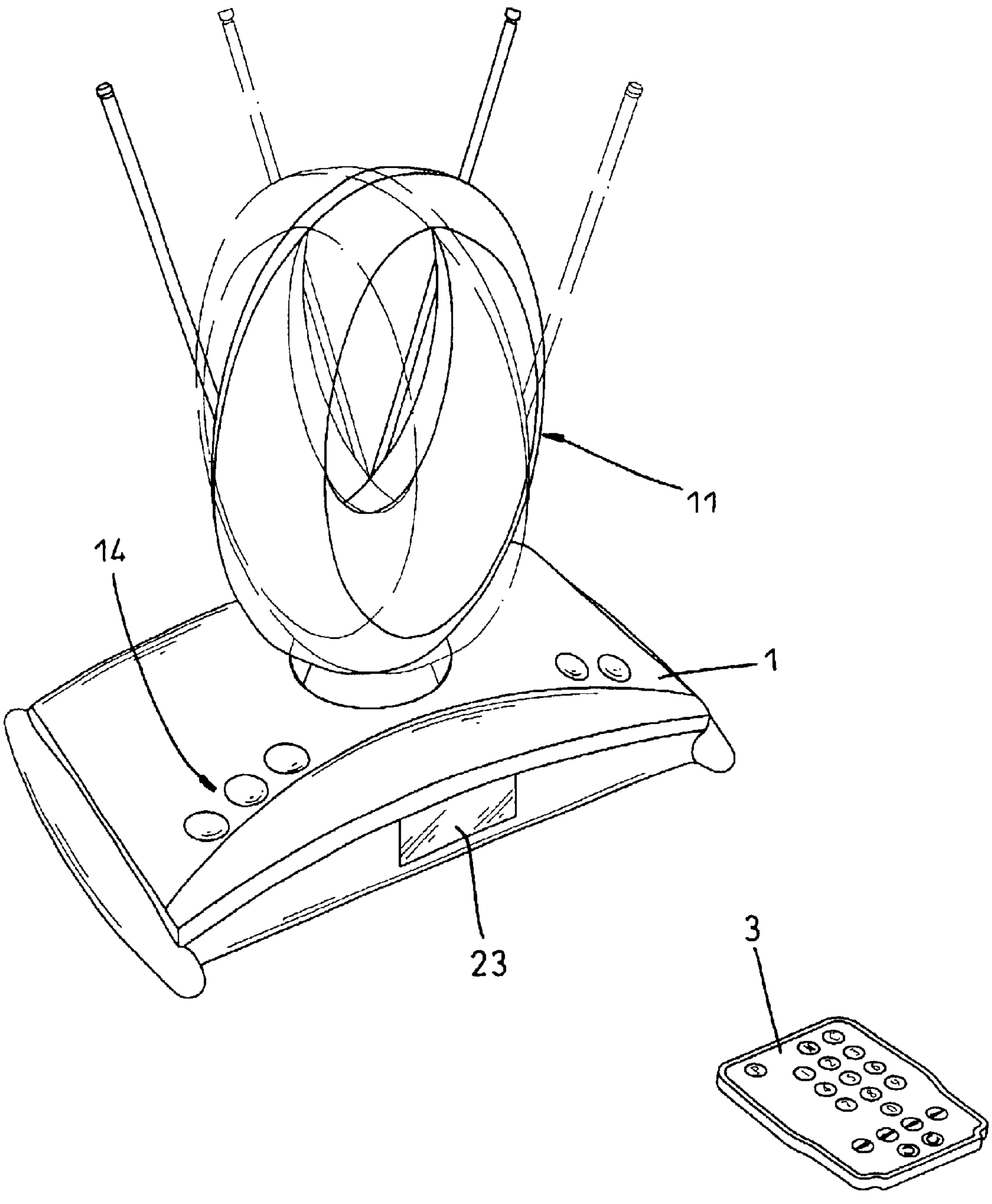
FIG. 5 is an operational perspective view of the antenna assembly in accordance with the present invention.

The wireless receiving assembly (21) is connected to the input terminal of the master controller (10) for receiving a remote signal from a remote control (3) as shown in FIG. 5, and the remote signal is inputted to the master controller (10). In this embodiment, the wireless receiving assembly (21) is an infrared (IR) receiving module (such a wireless remote control which is not restricted to a specific brand).

The aforementioned antenna assembly utilizes the master controller (10) to control the motor (253) in the rotation assembly (25) to rotate, and drive the gear set (251) to rotate.

Furthermore, the spindle (252) is engaged with the gear set (251), and thus the gear set (251) can activate the antenna set 11 to rotate, thereby adjusting the angle of the antenna set (11) and the adjustment value of the positioning detector (13).

In use of the antenna assembly in accordance with the present invention, the antenna set (11) is fixed in a specific angle to receive clear wireless video signals. Because the positioning detector (13) and the antenna set (11) are simultaneously activated by the rotation of the rotation assembly (25), when the antenna set (11) is adjusted to have a specific angle, the resistance of the positioning detector (13) is changed to obtain a corresponding voltage signal for being inputted to the master controller (10). The master controller (10) thus stores the voltage signal as a switched band number into the memory (15) for being associated with current channel identification number. Afterwards, when a corresponding channel number is entered by the key pad (14) or the remote control (not shown), the master controller (10) directly controls the rotation assembly (25) to rotate, so as to move the antenna set (11) to have an angle capable of receiving signals represented by the band number.

The master controller (10) with a learning function is suitable to use general remote controllers to enter corresponding channel number. The mater controller (10) receives and learns the remote signals represent channel numbers of the keys on the remote control (not shown). Once the master controller (10) has learned to judge what channel number the remote signal is represented, the master controller (10) is controlled to adjust the angel of the antenna set (11).

Figure 4:
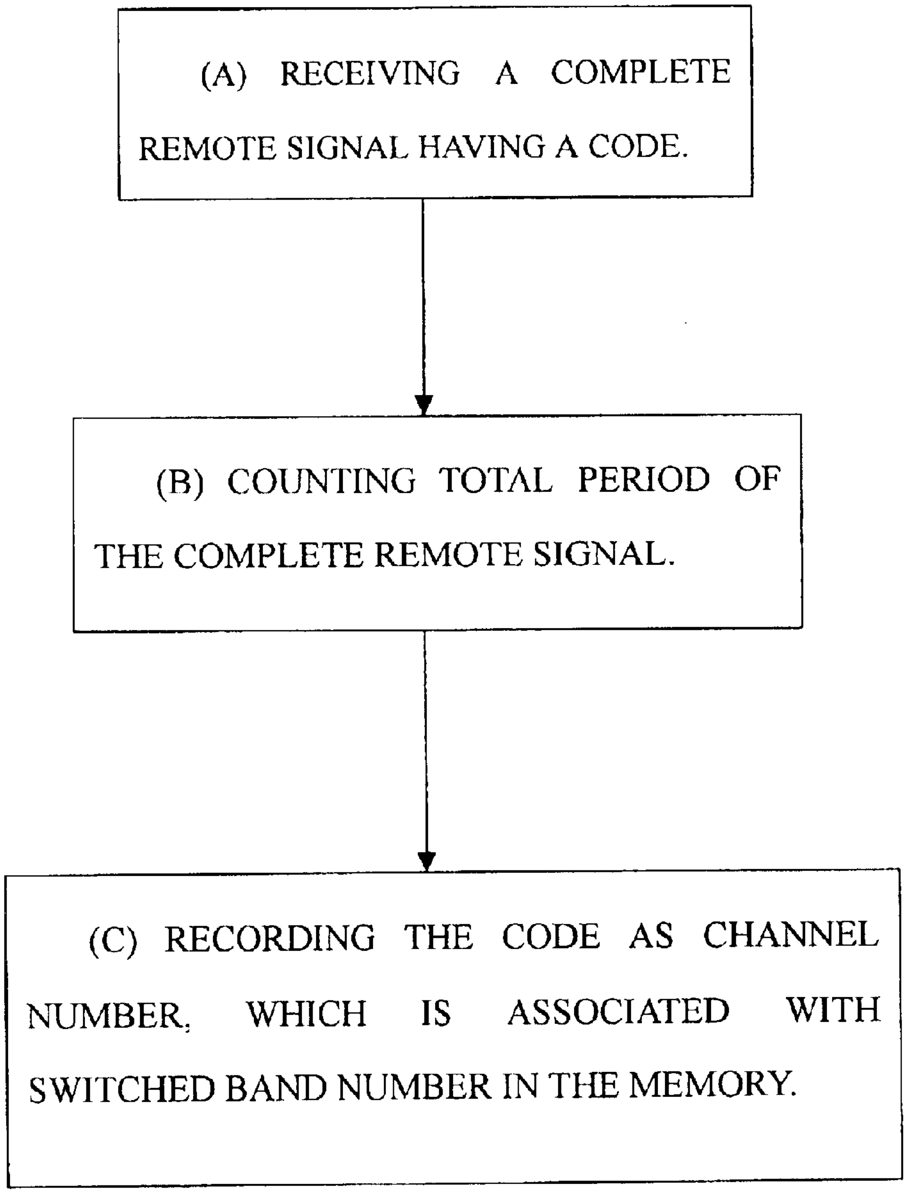
FIG. 4 is a flow chart of a searching method in the antenna assembly in accordance with the present invention.

In general, the wireless receiving assembly of the control circuit uses 38 KHz RF receiver to correctly receive the remote signal from the 36 KHz to 40 KHz remote signal. With reference to FIG. 4, the learning method comprises steps of (a) receiving a complete remote signal having a code;

(b) counting total period of the complete remote signal; and (c) recording the code as channel number, which is associated with switched band number in the memory.

The codes of remote signals of keys are different, but the total period of the complete remote signal is the same. Therefore the master controller (10) can learns to judge different remote signals by the above learning method. With reference to FIGS. 3 and 5, when the master controller (10) has learned the remote signals of the keys on the specific remote control (3), user uses the remote control (3) to enter the corresponding channel number to find out the corresponding switched band number. Therefore the maser controller (10) can control to automatically adjust the receiving angle of the antenna set (11) to receive the clear wireless video signal in specific band.

Based on the foregoing, as no default band is set in the master controller, the present invention is able to automatically set the optimal receiving band in the first-time use, and program a channel identification number. In addition, the antenna assembly can receive the common remote controls to be easy for the user to operate the antenna assembly in accordance with the present invention. Therefore, the present antenna assembly not only can automatically search wireless video signal and learn remote signals of the remote control, but also can memorize the searched bands.

Although the present invention has been explained in relation to its preferred embodiment, it is to be understood that many other possible modifications and variations can be made without departing from the spirit and scope of the invention as hereinafter claimed.

What is claimed is:

1. An antenna assembly having a learning remote signal function and capable of searching and memorizing wireless bands, comprising:

a casing having a top;

a rotation assembly retained in the casing wherein the rotation assembly has a motor to drive the rotation assembly to rotate;

an antenna set formed on the top of the casing and pivotally connected to the rotation assembly for adjusting its receiving angle by rotating the rotation assembly;

a control circuit connected and controlled to operation of the motor, wherein the control circuit comprises:

a master controller having multiple input terminals and output terminals and a learning method for learning to adjust remote signals represented different channel number on a specific remote control;

a positioning detector connected between the rotation assembly and the master controller for detecting a current position of the antenna set, and inputting the detected signal to the master controller;

a wireless receiving assembly connected to an input terminal of the master controller for receiving corresponding remote signals from the remote control and inputting the received remote signal to the master controller; and a memory connected to the master controller for recording data related to a plurality of frequency bands found out by the antenna set, wherein the master controller controls the rotation assembly to adjust the receiving angle of the antenna set by controlling the motor to rotate, and detects the position of the antenna set by the positioning detector for being inputted to the master controller, thereby searching and recording wireless frequency bands.

2. The antenna assembly as claimed in claim 1, wherein the rotation assembly further comprises a spindle and a gear set for controlling the spindle to rotate, and the gear set is connected to the motor for being driven by the motor.

3. The antenna assembly as claimed in claim 2, wherein the learning method comprises steps of (a) receiving a complete remote signal having a code;

(b) counting total period of the complete remote signal; and (c) recording the code as the channel number, which is associated with switched band number in the memory.

4. The antenna assembly as claimed in claim 1, further comprising a key pad connected to an input terminal of the master controller.

5. The antenna assembly as claimed in claim 1, further comprising a amplifier connected to an output terminal of the antenna set for amplifying output signals from the antenna set.

6. The antenna assembly as claimed in claim 1, further comprising a display assembly connected to the master controller through a display driver for being driven by the master controller to display.

7. The antenna assembly as claimed in claim 1, further comprising a switching circuit connected to an output terminal of the master controller, and connected between the amplifier and a cable TV signal terminal for switching either wireless TV signals or cable TV signals to a TV.

8. The antenna assembly as claimed in claim 1, wherein the wireless receiving assembly is an infrared receiving module.

9. The antenna assembly as claimed in claim 1, wherein the positioning detector is a potentiometer.

* * * * *